(12) United States Patent
Schmalz et al.

(10) Patent No.: US 10,472,088 B2
(45) Date of Patent: Nov. 12, 2019

(54) LIGHTING DEVICE AND TRUNK ELEMENT

(71) Applicant: Schott AG, Mainz (DE)

(72) Inventors: Kai Schmalz, Bad Kreuznach (DE); Christian Kokott, Wörrstadt (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/886,530

(22) Filed: Feb. 1, 2018

(65) Prior Publication Data

US 2018/0215480 A1 Aug. 2, 2018

(30) Foreign Application Priority Data

Feb. 1, 2017 (DE) .................. 10 2017 101 994

(51) Int. Cl.
*B64D 47/02* (2006.01)
*B60Q 3/44* (2017.01)
(Continued)

(52) U.S. Cl.
CPC .............. *B64D 47/02* (2013.01); *B60Q 3/44* (2017.02); *B60Q 3/47* (2017.02); *B60Q 3/76* (2017.02);
(Continued)

(58) Field of Classification Search
CPC ................... B64D 47/02; B64D 11/00; B64D 2011/0053; B60Q 3/47; B60Q 3/76; B60Q 3/44; F21V 19/0035; F21V 21/30; F21V 15/015; F21V 15/04; F21V 21/26; F21V 21/28; F21V 21/29; F21W 2107/30; F21W 2106/00; F21S 8/02; F21S 8/022; F21S 8/024; F21S 8/026; F21S 8/028
See application file for complete search history.

(56) References Cited

U.S. PATENT DOCUMENTS 1,001,842 A * 8/1911 Greenfield ............... F16L 11/18
138/120
1,276,117 A * 8/1918 Riebe ........................ F16C 1/26
138/120

(Continued)

FOREIGN PATENT DOCUMENTS

CN 204665103 U 9/2015
DE 28 05 585 A1 8/1979
(Continued)

OTHER PUBLICATIONS

U.S. Department of Transportation—Federal Aviation Administration FAA § FAR 25.853 Vertical Flammability Test—Fire Test to Aircraft Material, Sep. 13, 2007 (2 pages).
(Continued)

*Primary Examiner* — Joseph L Williams
*Assistant Examiner* — Jose M Diaz
(74) *Attorney, Agent, or Firm* — Taylor IP, P.C.

(57) ABSTRACT

A lighting device includes a semi-rigid arm having a tubular shape and an arm cavity, and proximal and distal ends, which can be brought into various positions, a lighting head which is attached to the distal end of the arm and supported by the arm, a support body with a receptacle cavity which accommodates the proximal end of the arm to support the arm, and an inner support sleeve which is disposed at the proximal end of the arm at least partially in the arm cavity.

29 Claims, 9 Drawing Sheets

(51) Int. Cl.
*B60Q 3/76* (2017.01)
*B64D 11/00* (2006.01)
*F21V 19/00* (2006.01)
*F21V 21/30* (2006.01)
*B60Q 3/47* (2017.01)
*F21V 21/32* (2006.01)
*F21V 23/00* (2015.01)
*F21W 107/30* (2018.01)
*F21W 106/00* (2018.01)

(52) U.S. Cl.
CPC .......... *B64D 11/00* (2013.01); *F21V 19/0035* (2013.01); *F21V 21/30* (2013.01); *F21V 21/32* (2013.01); *F21V 23/002* (2013.01); *B64D 2011/0053* (2013.01); *F21W 2106/00* (2018.01); *F21W 2107/30* (2018.01)

(56) References Cited

U.S. PATENT DOCUMENTS

| | | | | |
|---|---|---|---|---|
| 3,168,274 | A * | 2/1965 | Street | B23Q 1/285 248/160 |
| 3,204,990 | A * | 9/1965 | Ward | F16B 7/06 285/153.1 |
| 3,584,822 | A * | 6/1971 | Oram | F16M 11/40 248/160 |
| 4,452,414 | A * | 6/1984 | Ansems | F21V 21/28 248/122.1 |
| 5,141,325 | A * | 8/1992 | Huang | F21S 6/003 362/411 |
| D462,394 | S * | 9/2002 | Naghi | D21/333 |
| 6,648,376 | B2 * | 11/2003 | Christianson | E03C 1/06 138/120 |
| 7,182,490 | B2 * | 2/2007 | Hsu | F21S 9/02 362/396 |
| 8,448,669 | B2 * | 5/2013 | Wen | B60T 11/046 138/119 |
| 8,497,427 | B2 * | 7/2013 | Wen | F16C 1/26 174/102 R |
| 9,291,337 | B1 * | 3/2016 | Hulett | B23Q 17/2404 |
| 2003/0210543 | A1 * | 11/2003 | Sharrah | F21L 4/027 362/187 |
| 2004/0264202 | A1 * | 12/2004 | Lu | F21V 21/29 362/362 |
| 2005/0052877 | A1 * | 3/2005 | Wu | F21V 21/30 362/429 |
| 2007/0014084 | A1 * | 1/2007 | Jobs | F16M 11/14 361/679.22 |
| 2011/0038064 | A1 * | 2/2011 | Xhunga | E03C 1/06 359/811 |
| 2013/0048818 | A1 * | 2/2013 | Von Pechmann | F16M 11/40 248/276.1 |
| 2015/0338018 | A1 * | 11/2015 | Rovekamp, Jr. | F16M 11/40 248/276.1 |
| 2016/0070048 | A1 | 3/2016 | Dietrich | |
| 2016/0143410 | A1 * | 5/2016 | Stampe | B26B 19/46 606/133 |
| 2016/0178170 | A1 * | 6/2016 | Nopper | F21V 21/14 362/419 |

FOREIGN PATENT DOCUMENTS

| | | |
|---|---|---|
| DE | 195 02 658 C1 | 3/1996 |
| DE | 296 03 790 U1 | 7/1997 |
| DE | 298 15 260 U1 | 12/1998 |
| DE | 10 2013 201 531 A1 | 7/2014 |
| DE | 10 2013 109 359 A1 | 3/2015 |
| EP | 0 724 023 A1 | 7/1996 |
| JP | 2016-142072 A | 8/2016 |

OTHER PUBLICATIONS

"Fireworthiness Requirements for the Pressurized Section of Fuselage", Airbus § ABD 0031, Issue G, Fire, smoke and toxicity specifications, Aug. 19, 2014 (16 pages).
Boeing Proprietary, Boeing § D6-36440, Standard Cabin System Requirements Document, vol. 1, Mar. 4, 1996 (114 pages).

* cited by examiner

LIGHTING DEVICE AND TRUNK ELEMENT

BACKGROUND OF THE INVENTION

1. Field of the Invention

The invention relates to a lighting device, in particular a lighting device for mounting on an interior of an aircraft, and further relates to a trunk element particular for a lighting device.

2. Description of the Related Art

Lighting in aircraft interiors is of high importance in terms of the well-being of passengers on board. In terms of design and functionality, passenger seat lamps which can be freely aligned by the passengers and thus allow an individual alignment of the light beam are particularly popular.

In particular reading lamps that have a flexible arm can be used for this purpose, in which the arm can be brought into a desired position or can be formed by a user and remains in this position in self-supporting manner. This allows a lighting head located at the end of the arm to be substantially freely positioned and aligned.

Accordingly, the passengers of an aircraft can selectively adjust their seat lighting to their needs. On the other hand, aviation personnel can also align the reading lamps, e.g. prior to boarding, in order to create a pleasant atmosphere.

However, if the arm of the lamp, which is supporting the lighting head, is attached to the interior of the aircraft on its end opposite to the lighting head, problems as to the attachment of the arm may arise over time due to the permanent deformation of the arm. For example, the arm might become loosened or even detached from a receptacle in which it is clamped or glued.

Such problems may in particular arise if the flexible arm is made of a spiraled wound hose and torsion of the hose can result in some variation of the diameter thereof. A torsional load can then cause peeling forces on the surface of the arm which is clamped or glued in the receptacle, which would then be inadmissibly loaded and might even be torn off. As a result, the reading lamp might be damaged so that it usually would have to be repaired or replaced at respective costs.

SUMMARY OF THE INVENTION

The present invention provides for improvement in the support of a flexible arm in a receptacle, in particular for an arm which is provided in the form of a wound hose.

The present invention relates to a lighting device, for example a passenger seat lamp for being permanently mounted on the interior of an aircraft.

In accordance with an embodiment of the present invention, the lighting device includes a flexible semi-rigid arm which can be brought into various positions in all directions by manual bending. This means a mobility or agility of the flexible semi-rigid arm in the three dimensions. The arm has a tubular shape, i.e. is in the form of a hose, and accordingly has an inner arm cavity.

Furthermore, in accordance with an embodiment of the present invention, the arm has proximal and distal ends. A lighting head is attached to and supported by the arm at the distal end of the arm. The lighting head can be positioned, pivoted and/or oriented by bending the arm and remains in the adjusted position with the arm. In other words, the arm is flexible on the one hand, but is rigid on the other hand if no sufficient external force is applied, so that it remains in a bent position in self-supporting manner while supporting the lighting head.

Furthermore, in accordance with an embodiment of the present invention, the lighting device comprises a support body with a receptacle cavity which accommodates the proximal end of the arm to support the arm. The support body may be mounted on the interior of an aircraft, for example.

Furthermore, in accordance with an embodiment of the present invention, an inner support sleeve is provided which is disposed at the proximal end of the arm at least partially in the arm cavity. The support sleeve engages in the arm cavity and supports the arm from inside. Thereby, the proximal end of the arm can be prevented from becoming deformed or tapered and from being loosened or detached from the receptacle cavity. In other words, the inner support sleeve counteracts deforming or tapering tendencies of the arm in the area of the proximal end of the arm, in particular in the case of a torsional movement of the arm, which can lead to tapering, in particular if the arm is of spiraled design.

In accordance with an embodiment of the present invention, the inner support sleeve may be inserted in the arm cavity with a certain radial clearance. However, small clearances to the inner diameter of the arm which is provided in the form of a wound hose, for example, are preferred. In other words, it is preferable that the inner sleeve closely engages on the inner wall of the arm.

In one embodiment of the invention, the portion of the inner support sleeve at least partially disposed in the arm is disposed in the arm cavity with a radial clearance of less than 1 millimeter, preferably less than 0.5 millimeter, more preferably less than 0.1 millimeter.

According to a further embodiment, it may as well be contemplated that the inner support sleeve is firmly clamped, glued, or welded in the arm cavity. Furthermore, the support sleeve may as well have an outer diameter which varies in the axial direction, e.g. enlarges towards the proximal end of the arm. The outer diameter may have a conical shape, for example. As a result, the radial clearance to the arm may gradually reduce until achieving a press fit at the end of the support sleeve.

In one embodiment of the invention, it may be contemplated that a further inner support sleeve is embedded in the arm cavity at the distal end of the arm in order to improve the attachment of the lighting head.

In a preferred embodiment, the arm has an arm inner surface facing the arm cavity and an opposite arm outer surface, and the receptacle cavity of the support body has a radial receptacle cavity inner surface which is radially clamped and/or glued to the arm outer surface in the area of the proximal end of the arm.

Thus, the arm outer surface can form a contact surface to the receptacle which is subjected to torsional loads. Due to the inner support sleeve, the arm outer surface can press against the receptacle cavity inner surface and prevent an optional glue bond from detaching. In other words, the arm can be seated in the receptacle cavity by clamping and/or gluing. However, it may as well be contemplated that the arm is fixed in the receptacle cavity by crimping, screwing, or by means of a bayonet holder.

In one embodiment of the invention, the arm has an annular arm end face at its proximal end, and the inner support sleeve has a tubular portion and an outer collar connected to the tubular portion, wherein the tubular portion engages in the arm cavity and the outer collar abuts against the arm end face. Thus, the support sleeve can in particular advantageously be prevented from getting too far into the arm cavity. A varying outer diameter of the support sleeve, as described above, may in particular be provided in the area of the tubular portion.

In accordance with an embodiment of the present invention, the diameter of the preferably cylindrical inner support sleeve, in particular of the outer collar, is smaller or at least not greater than the inner diameter of the radial inner surface of the receptacle cavity which is preferably also of cylindrical shape.

In accordance with an embodiment of the present invention, it may furthermore be preferred that the receptacle cavity of the support body has a receptacle cavity rear inner surface, and that the inner support sleeve abuts against the rear inner surface of the receptacle cavity, wherein, in particular, the outer collar of the inner support sleeve abuts against the rear inner surface of the receptacle cavity, so that the outer collar of the inner support sleeve is fixed between the rear inner surface of the receptacle cavity and the end face of the arm. In other words, the collar of the support sleeve may be clamped between the support body and the arm. One advantage hereof is that the support sleeve does not detach from the cavity of the arm.

Preferably, in accordance with an embodiment of the present invention, the support sleeve has thin walls so that supply cables can be passed therethrough. According to a preferred embodiment of the invention it is contemplated that a cable passage is provided in the rear inner surface of the receptacle cavity, and a supply cable is provided, which extends through the cable passage and through the inner support sleeve and through the arm cavity towards the distal end thereof, to the lighting head.

In accordance with an embodiment of the present invention, the supply cable preferably comprises at least one electrical conductor and/or one optical waveguide.

In a further embodiment, the supply cable comprises a strain relief element. The strain relief element may for instance be provided in the form of a contracted shrink tube that firmly encloses the supply cable.

Furthermore, in accordance with an embodiment of the present invention, the inner support sleeve may have a support sleeve inner projection which functions as an abutment for the strain relief element of the supply cable when a tensile force is exerted on the supply cable in the proximal direction. In this way it can be prevented that the tensile force exerted on the cable causes disconnection of the contact on the lighting head.

In one embodiment of the invention, the inner support sleeve and/or the support sleeve inner projection has at least one support sleeve inner edge which is beveled and/or rounded. If the inner edges are rounded or beveled, damage to the materials to be passed through can advantageously be avoided.

In a preferred embodiment, the flexible semi-rigid arm comprises or is provided in the form of a wound hose. In other words, the arm can be made substantially from a wound hose. The wound hose may comprise at least two helically interengaging spiraled metal wires. The two spiraled metal wires may have different cross sections and/or may be made of different materials. For example, one of the two spiraled metal wires may have a round cross section and the other one of the two spiraled metal wires may have a wedge-shaped cross section.

Furthermore, in accordance with an embodiment of the present invention, one of the two spiraled metal wires, for example, in particular the spiraled metal wire having a round cross section, may be made of a harder material than the other one of the two spiraled metal wires, in particular the spiraled metal wire having a wedge-shaped cross section. It may be contemplated that the round metal wire is made of steel, such as austenitic, ferritic, and/or V2A steel (NIROSTA), for example, and the wedge-shaped metal wire is made of brass or aluminum. Furthermore, the outer configuration of the arm may include a sheath, such as the tubular covering sheath described below in more detail, or the arm may comprise further inner components, such as additional preferably elastic hoses which may be arranged adjoining a wall of the arm, for sealing purposes.

The outward facing areas of the arm may have a surface finish, in particular a polished or ground surface, and can be covered or coated. Coatings may comprise varnishes, in particular such having a textile appearance, Nextel with suede haptic, Zapon varnishes, or else galvanic metal layers.

In a further embodiment of the invention, the flexible semi-rigid arm comprises a tubular covering sheath which in particular covers the wound hose of the arm, wherein the tubular covering sheath is preferably made of leather, synthetic leather, or plastics. The tubular covering sheath or a corresponding sheath may comprise a colored shrink tube sheath (polyolefin shrink tube), varnishes in all available RAL colors with a subsequent transparent shrink tube sheath (polyolefin shrink tube), or else a PTFE shrink tube sheath. Furthermore, it is possible to use PU sheaths, silicone sheaths, PET sheaths, and FEP sheaths (fluorinated ethylene-propylene sheaths).

In accordance with an embodiment of the present invention, the covering sheath may also enclose the proximal end of the arm, which is accommodated in the receptacle cavity, and can thus form the arm outer surface. On the other hand, it may as well be contemplated that the covering sheath is omitted in the area in which the arm is seated in the receptacle cavity, so that the wound hose forms the arm outer surface.

In accordance with an embodiment of the present invention, the inner support sleeve inserted in the cavity of the arm is preferably made of metal, in particular of aluminum or steel. The material of the support sleeve is preferably non-ductile or should exceed a yield strength (Rp0.2) of preferably greater than 100 N/mm$^2$, and more preferably greater than 150 N/mm$^2$. Furthermore, the material is preferably corrosion resistant, which is important for the requirements of the aircraft industry, for example.

In accordance with an embodiment of the present invention, preferred materials for the inner support sleeve include aluminum alloys which are solution annealed and artificially aged according to the key for heat treatment of DIN EN 515 and according to this key are referred to as T6, and stainless steels. It is also possible to use fiber composite materials insofar as these are authorized for use in the interior of aircraft, in particular passenger aircraft, due to intrinsic flame-retardant properties or flame-retardant additives. The following regulations, which are herein incorporated in their entirety by reference, can be used to determine and ensure the flame retardant properties, and the requirements specified therein must be met:

i) U.S. Department of Transportation—Federal Aviation Administration FAA § FAR 25.853 Vertical Flammability Test—Fire Test to Aircraft Material;
ii) Airbus § ABD 0031: "Fire, smoke and toxicity specifications";
iii) Boeing § D6-36440—Standard Cabin System Requirements Document, Volume 1.

As the title of the Airbus standard indicates, not only the "flammability properties" (Fire) are usually defined, but also statements are made regarding the admissible smoke development (Smoke) and the toxicity of the combustion gases (Toxicity) (FST test, for short).

In accordance with an embodiment of the present invention, further preferred materials include glass fiber and carbon fiber reinforced plastics and ceramics. Moreover, the inner support sleeve may as well be produced as an injection-molded part, in particular if it comprises plastic components that are suitable for injection molding.

In accordance with an embodiment of the present invention, the inner support sleeve preferably has a weight of less than "max. 10" grams.

The invention furthermore relates to a trunk element, in particular for any of the lighting devices according to the embodiments described above.

In accordance with an embodiment of the present invention, the trunk element comprises a flexible semi-rigid tubular body with a tubular cavity, a receptacle body with a receptacle cavity which accommodates one end of the tubular body, and an inner support sleeve which is arranged at an end of and at least partially within the tubular body.

Furthermore, the invention relates to a support sleeve for a trunk element or a lighting device for being inserted into a tubular cavity of a flexible semi-rigid tubular body, in particular for being inserted into an arm cavity of a flexible semi-rigid arm of tubular shape.

The invention also relates to a use of a lighting device as a passenger seat lamp for being permanently mounted on the interior of an aircraft, wherein the lighting device comprises: a preferably flexible semi-rigid arm which can be brought into various positions, preferably by manual bending, which arm has a tubular shape and an arm cavity, and proximal and distal ends, a lighting head which is attached to the distal end of the arm and supported by the arm, a support body with a receptacle cavity which accommodates the proximal end of the arm to support the arm, and an inner support sleeve which is disposed at the proximal end of the arm at least partially in the arm cavity.

The invention will now be described in more detail by way of exemplary embodiments and with reference to the figures, wherein the same and similar elements are partly designated by the same reference numerals and wherein the features of the different exemplary embodiments can be combined with one another.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
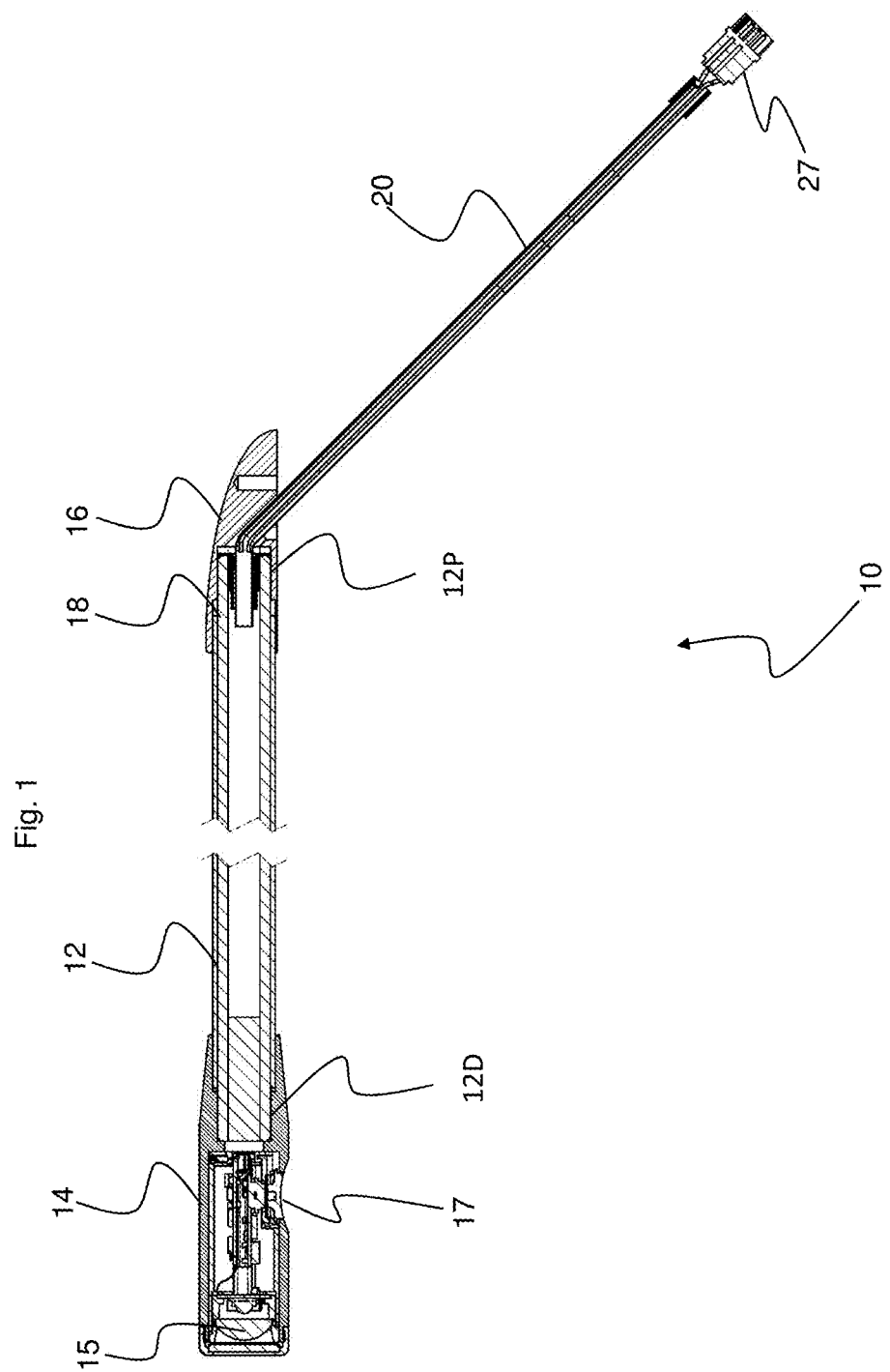
FIG. 1 is a sectional view of a lighting device with a first support body.
Figure 2:
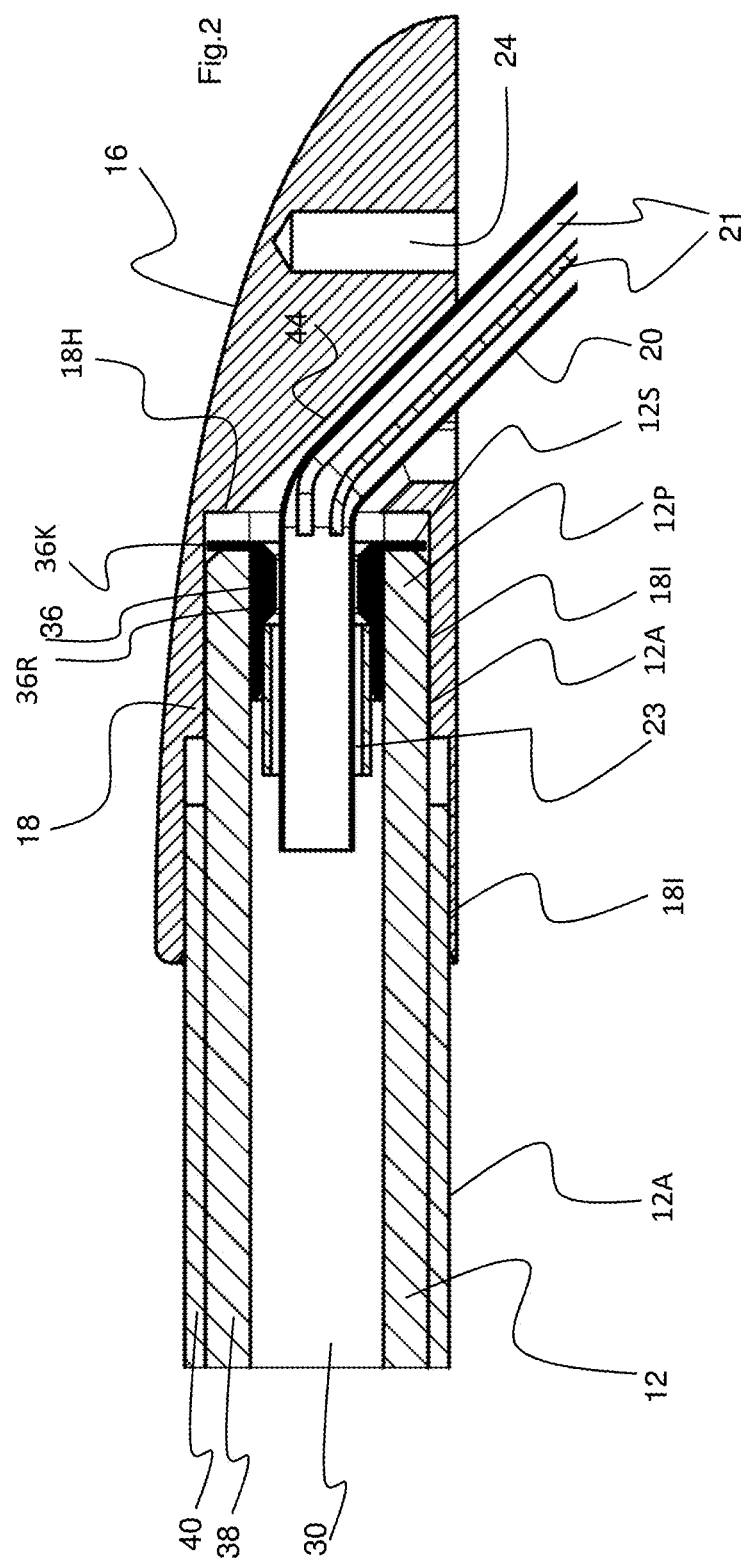
FIG. 2 is a view of a detail of the first support body of FIG. 1.
Figure 3:
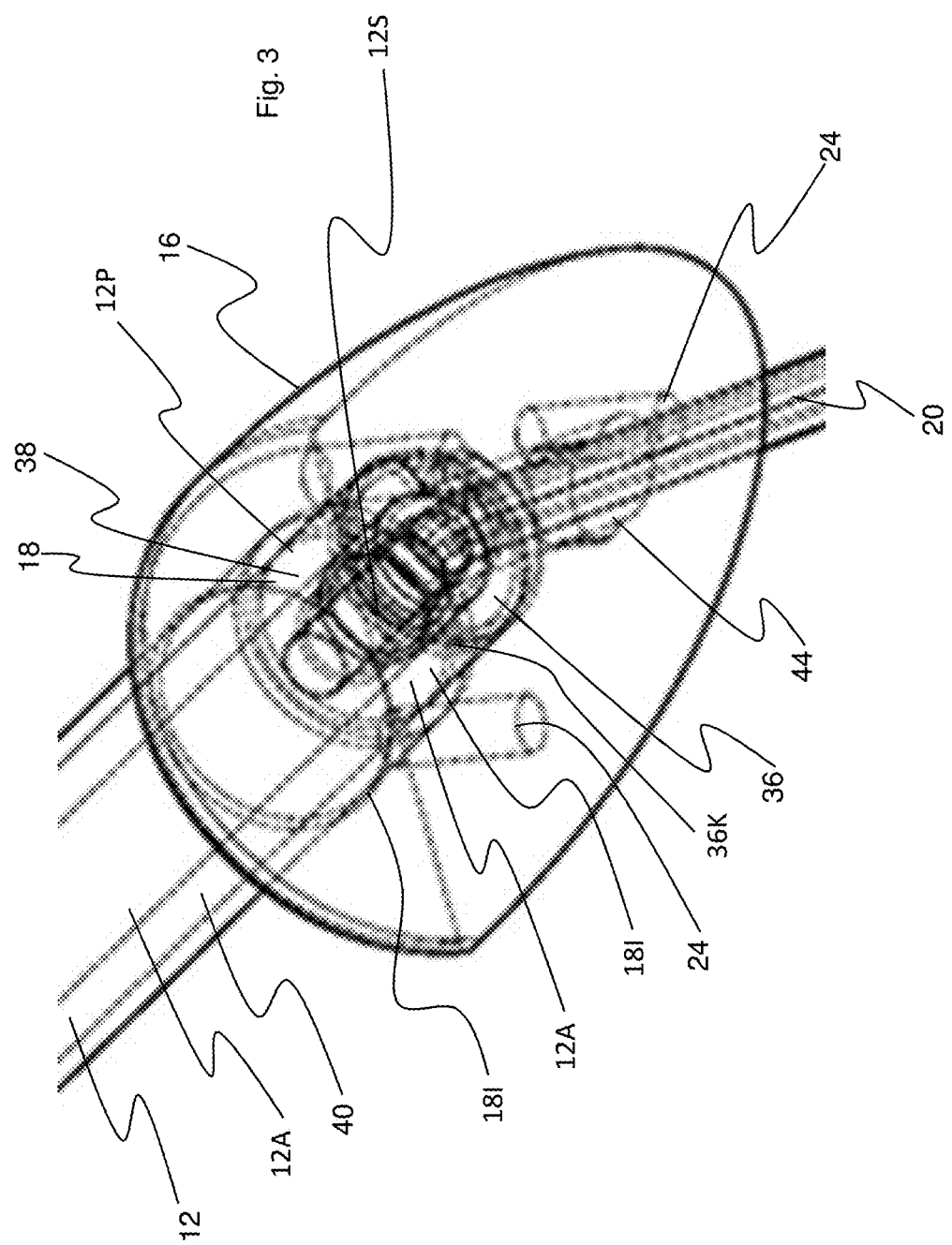
FIG. 3 is a three-dimensional view of a detail of the first support body of FIG. 1.

In the following description of preferred embodiments, substantially identical functional elements or features of a respective embodiment are designated by the same reference numerals.

In the following, reference is made to FIGS. 1, 4, and 6.

Figure 4:
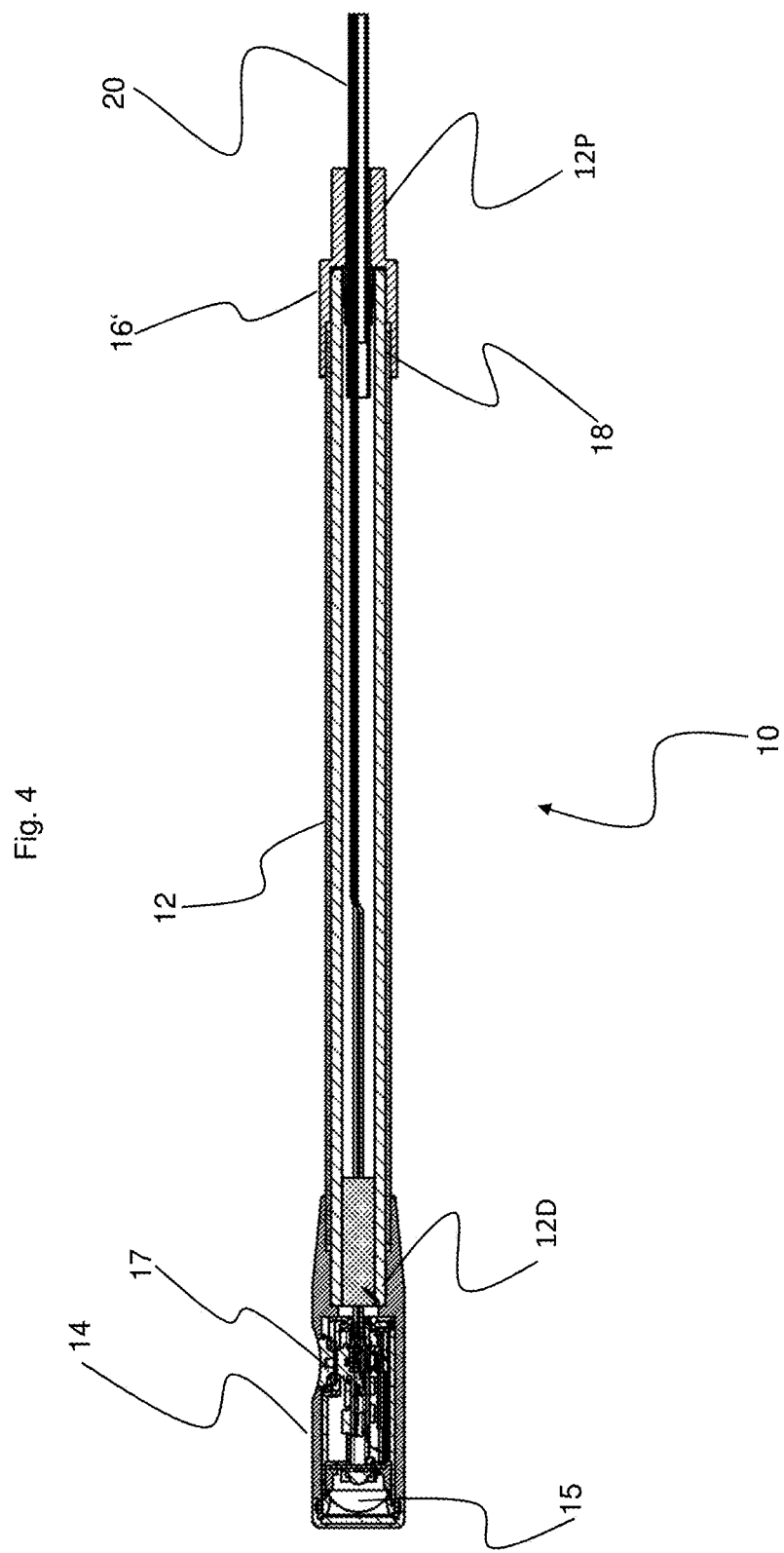
FIG. 4 is a sectional view of a lighting device with a second support body.
Figure 5:
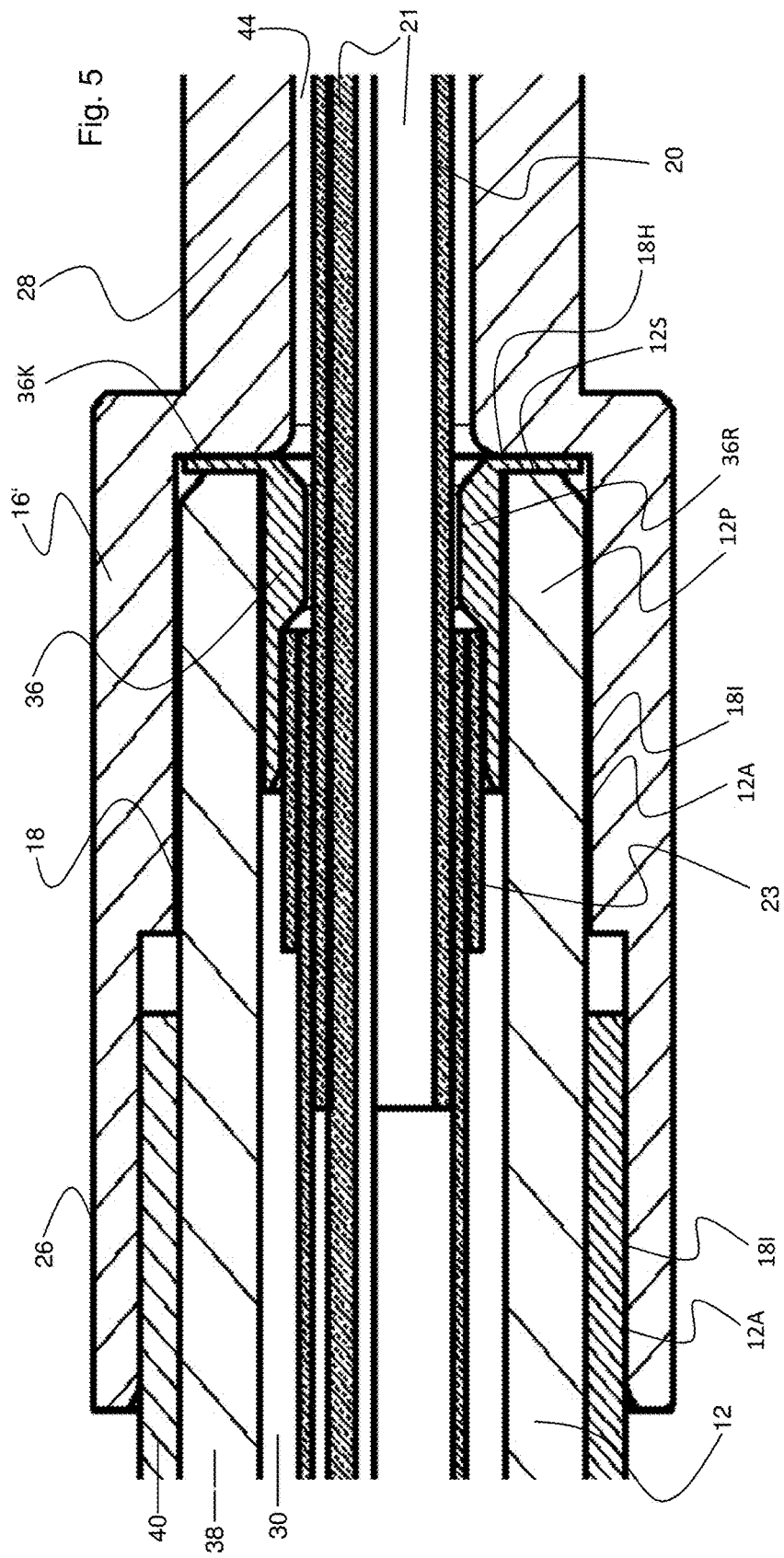
FIG. 5 is a view of a detail of the second support body of FIG. 4.
Figure 6:
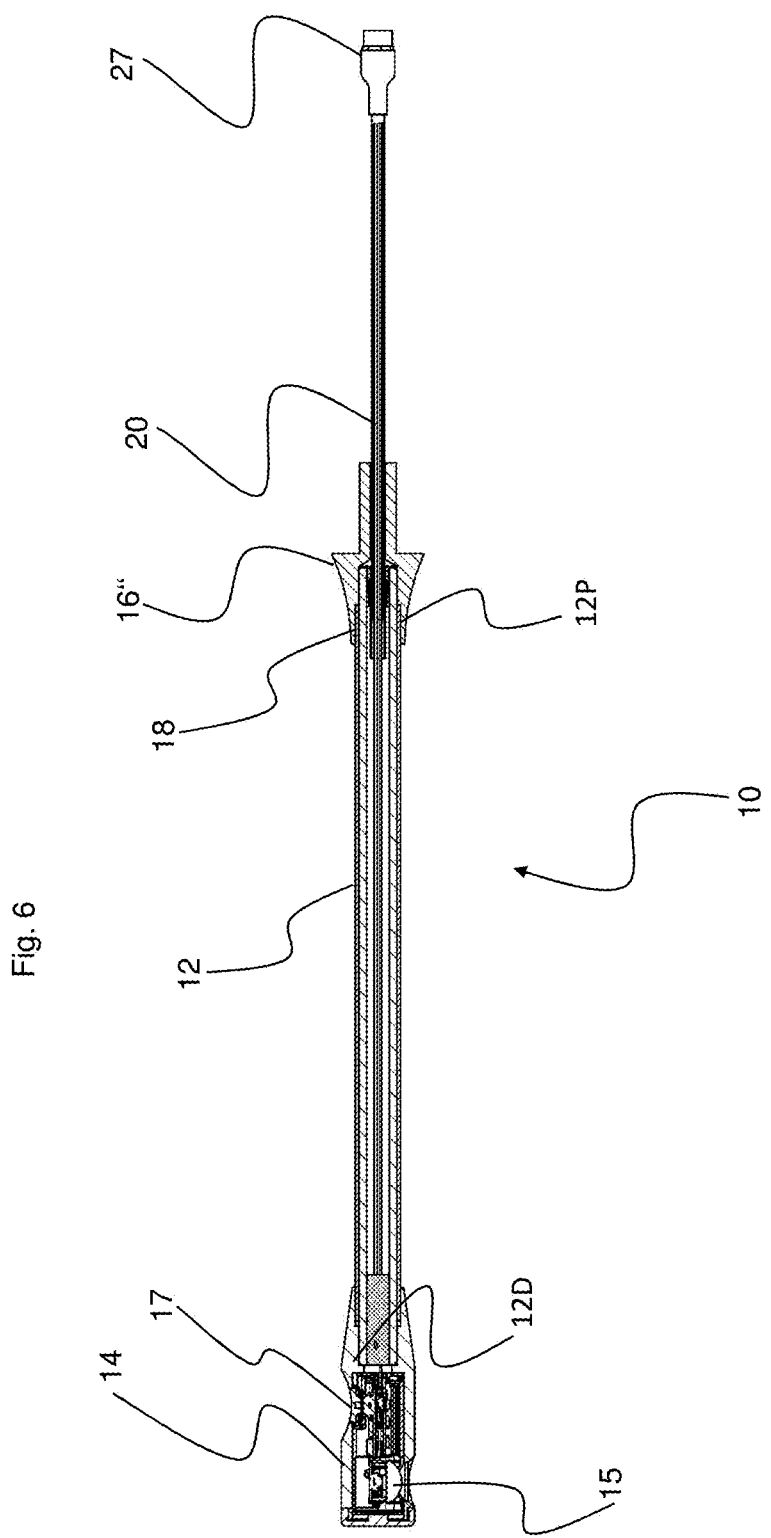
FIG. 6 is a sectional view of a lighting device with a third support body.
Figure 7:
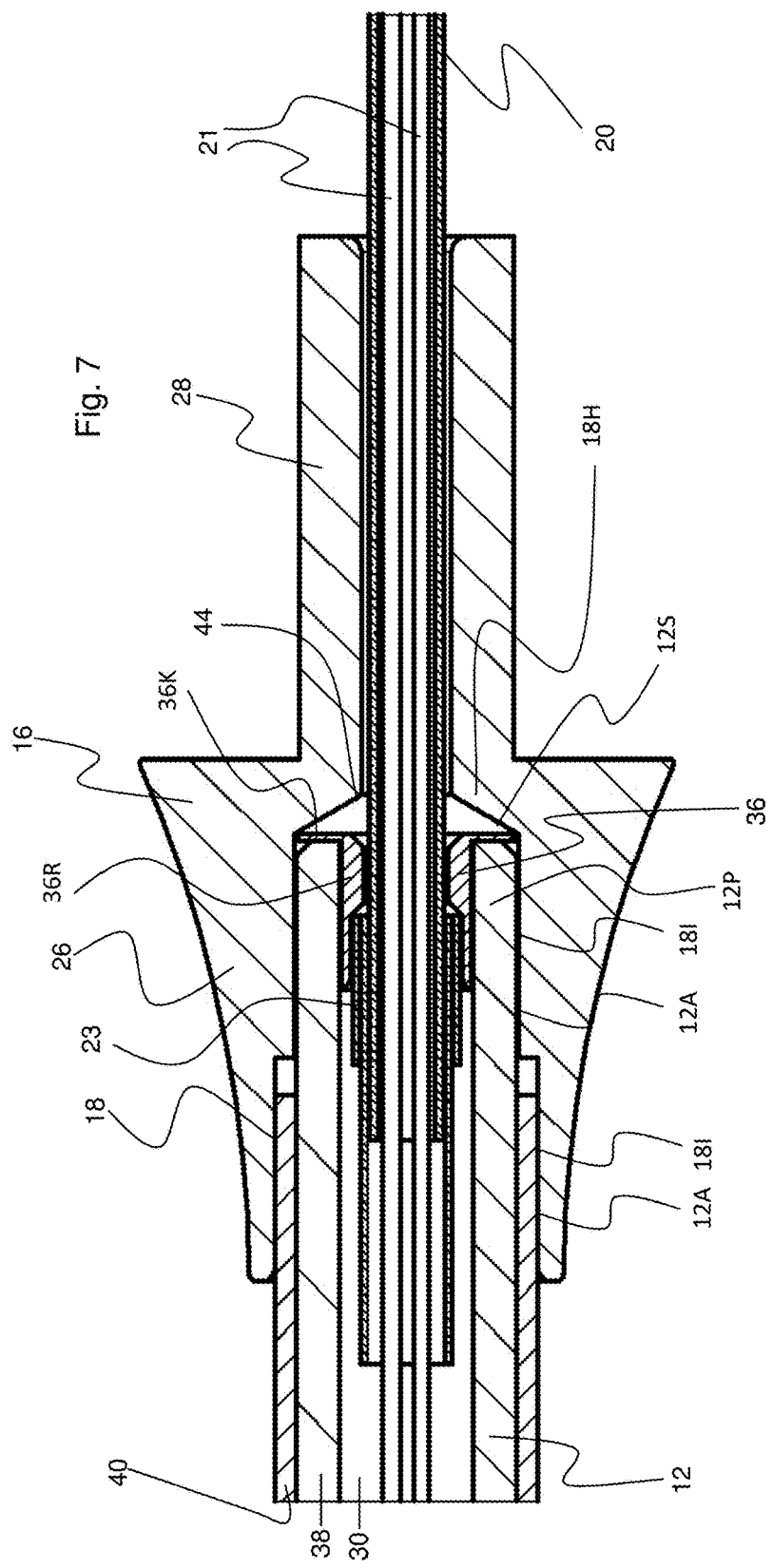
FIG. 7 is a view of a detail of the third support body of FIG. 6.

FIGS. 1, 4, and 6 show different embodiments of a lighting device 10, each one comprising an arm 12 which may in particular also be a support arm, a lighting head 14, and a support body 16, 16', and 16", respectively.

Lighting head 14 is attached to the distal end 12D of arm 12 in each case. At its proximal end 12P, the arm 12 is accommodated and supported in a receptacle cavity 18 of the respective support body 16, 16', or 16".

Within the lighting head, a lamp 15 is placed, which can be in the form of a light emitting diode, for example. In the embodiments illustrated in FIGS. 1 and 4, an axial emission direction of the light is provided, while the light is emitted radially in the embodiment illustrated in FIG. 6.

Furthermore, a switch 17 in the form of a switch button is arranged in the lighting head for turn on and off the lamp 15. Optionally, further adjustment options may be provided, such as a possibility to adjust the brightness and color through specific operating patterns of the switch button, for example.

Lamp 15 is supplied with electrical power through a supply cable 20 which may have a plug 27 mounted to an end thereof. In one embodiment (not shown), a light exit may be arranged in the lighting head, and the supply cable comprises a glass fiber in order to supply light to the light exit.

FIGS. 2, 3, 5, and 7 are detailed views of different embodiments in the area of the respective support bodies 16, 16', and 16" supporting the arm 12.

Support body 16 (FIGS. 2, 3) which may be made of metal is intended to be mounted on a wall surface and has blind holes 24 for receiving fastening bolts, wherein the blind holes 24 may have an internal thread. Support bodies 16' and 16" (FIGS. 5, 7) each have a seat portion 26 for accommodating the arm 12, and a base portion 28, wherein the base portion 28 in turn is accommodated in a corresponding retaining opening (not shown) and may in particular be anchored therein.

The proximal end 12P of arm 12, in particular the arm outer surface 12A, is glued and/or clamped in receptacle cavity 18 of holding body 16, 16', 16". In other words, the radial arm outer surface 12A is clamped and/or glued to an opposed receptacle cavity inner surface 18I.

In the illustrated embodiments, the receptacle cavity inner surface 18I is of stepped configuration and comprises two portions of different inner diameters for two portions of the arm outer surface 12A which have different outer diameters. The two different outer diameters of arm 12 near the proximal end 12P are defined by an inner wound hose 38 which substantially forms the arm 12 imparting it its semi-rigid property, and in particular by an outer covering sheath 40 that is partly omitted at the proximal end 12P of arm 12. Semi-rigid in the context of the invention is understood as the property according to which the item referred to as being semi-rigid is dimensionally stable without external influences, in particular without external forces, with the exception of the respective prevailing gravity, and thus provides a rigidity which keeps the item in its form. However, the item referred to as being semi-rigid can be modified in terms of its shape by exerting an external force, in particular reversibly, and once the exertion of a force has been terminated it will again provide sufficient rigidity to remain in its modified form.

The flexible arm 12, or the wound hose 38, is in the form of a tube and encloses an inner arm cavity 30 directing the supply cable 20 to lighting head 14.

At the proximal end of arm 12P, a stable metallic inner support sleeve 36 is inserted into the arm cavity 30. Inner support sleeve 36 supports the arm 12 from inside and protects and/or reinforces the clamping and/or gluing connection between the arm outer surface 12A and the receptacle cavity inner surface 18I. In particular, this support sleeve 36 in the form of a thin-walled inner sleeve prevents or reduces peeling forces that might occur under torsional loads on the arm 12 and thus reduces the susceptibility of the lighting device 10 to become damaged.

Figure 8:
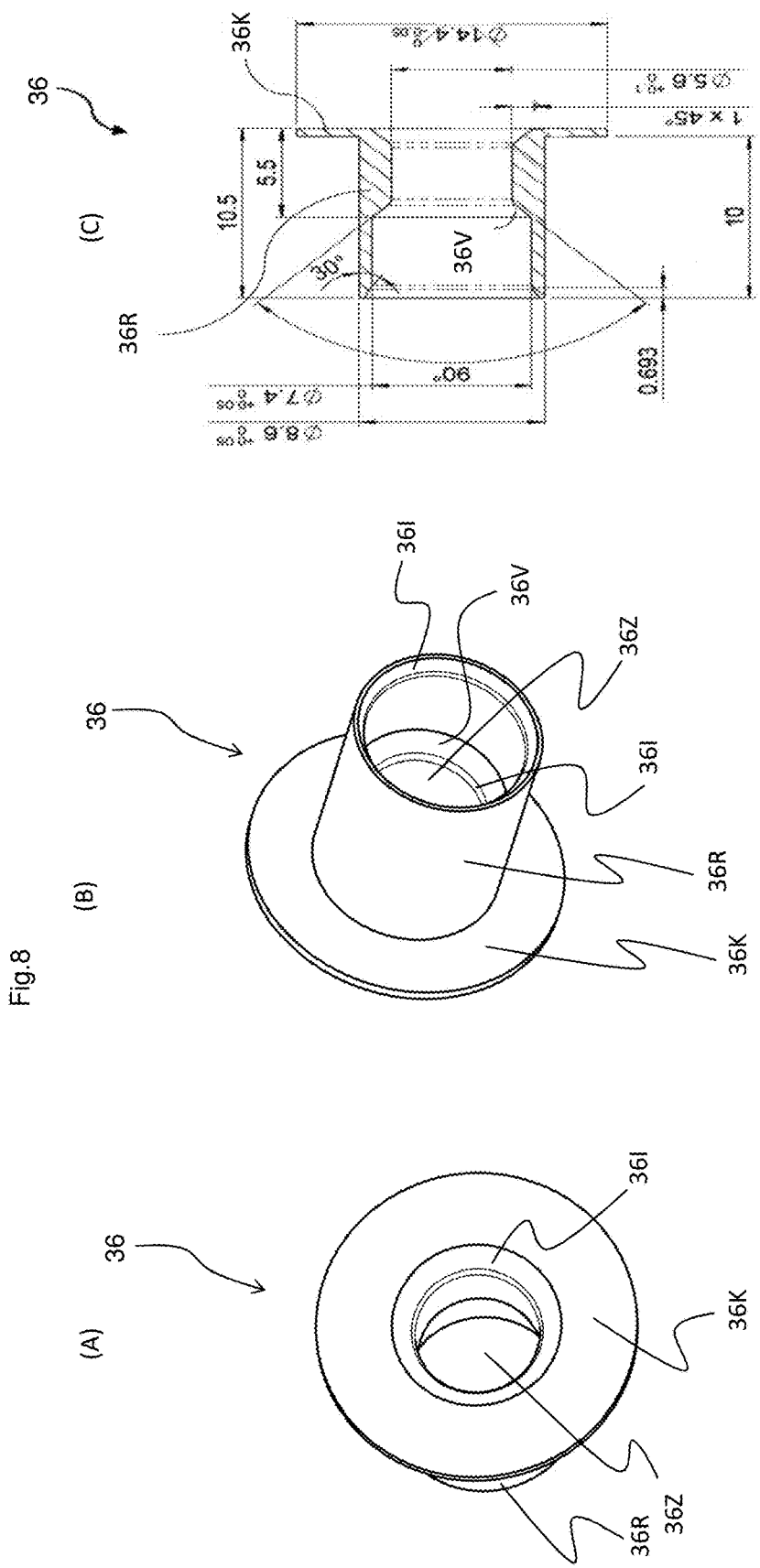
FIG. 8 shows three-dimensional views of a support sleeve (A, B), and a sectional view of the support sleeve (C) with size dimensions specified in millimeters.

Inner support sleeve 36 has a tubular portion 36R and an outer collar 36K connected to the tubular portion (see also FIGS. 8A to 8C). The tubular portion 36R of the support sleeve is inserted into arm cavity 30, while the outer collar 36K serves as an abutment and abuts on the annular arm end face 12S on the one side, and on the other side engages on the receptacle cavity rear inner surface 18H in its assembled state. In this way, it is ensured that support sleeve 36 is fixed on both sides in the axial direction and is permanently seated on and supports the proximal end 12P of arm 12.

Supply cable 20 comprises electrical conductors 21, and according to one embodiment it is as well possible to provide an optical waveguide 19. Supply cable 20 and/or the electrical conductors 21 or an optical waveguide extends from outside through a cable passage 44 of support body 16, 16', 16", which opens into the receptacle cavity 18, through the central opening 36Z of the inner support sleeve 36 and through arm cavity 30 towards the distal end thereof, to lighting head 14.

Supply cable 20 comprises a strain relief element 23 which enlarges the diameter of the cable and is provided in the form of a contracted shrink tube that firmly encloses the cable, for example. When a tensile force is exerted on the cable 20 in the proximal direction, the strain relief element 23 abuts against an inner projection 36V of support sleeve 36. The inner edges 36I of the support sleeve are preferably rounded or beveled.

Figure 9:
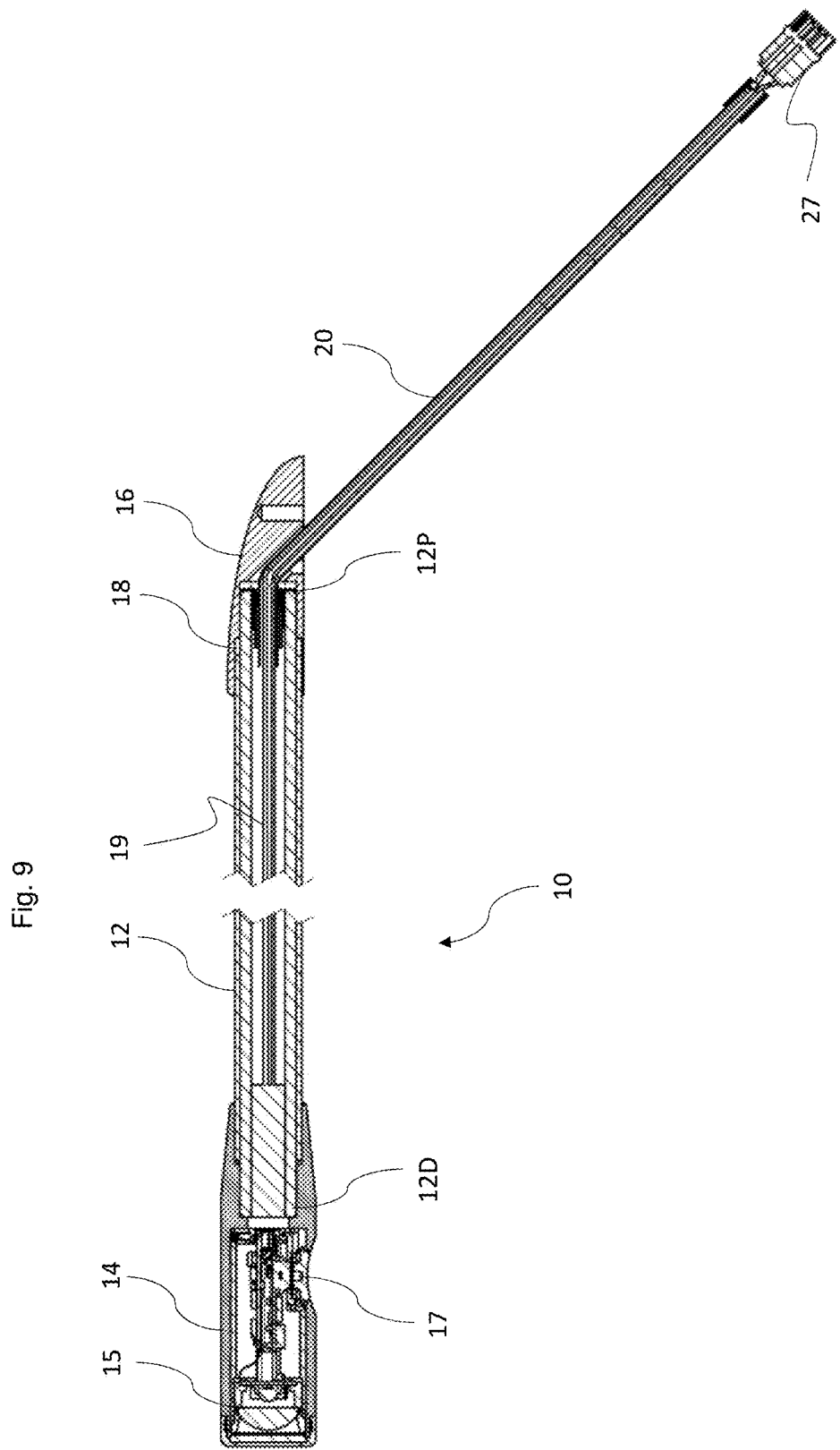
FIG. 9 is a sectional view of the lighting device with a first support body of FIG. 1, comprising a waveguide.

FIG. 9 finally shows a sectional view of the lighting device 10 with a first support body as shown in FIG. 1, comprising an arm 12, in which an optical waveguide 19 is arranged. Instead of or in addition to the optical waveguide 19 and an electrical conductor 21 may be laid in the arm 12. It will be apparent to those skilled in the art that the other embodiments of the lighting device 10 may include such an optical waveguide 19.

Furthermore, use in the field of automobile industry, automotive, and rail-guided transport vehicles is possible as well.

Also, the use of a lighting device as a passenger seat lamp for being permanently mounted on the interior of an aircraft is within the scope of the present invention, in particular if the lighting device comprises: a preferably flexible semi-rigid arm which can be brought into various positions in all directions, preferably by manual bending, which arm has a tubular shape and an arm cavity, and proximal and distal ends, a lighting head which is attached to the distal end of the arm and supported by the arm, a support body with a receptacle cavity which accommodates the proximal end of the arm to support the arm, and an inner support sleeve which is disposed at the proximal end of the arm at least partially in the arm cavity.

It will be apparent to a person skilled in the art that the embodiments described above are given by way of example, and that the invention is not limited thereto, but can be varied in various ways without departing from the scope of the claims. Furthermore, it will be apparent that the features, regardless of whether they are disclosed in the specification, the claims, the figures, or otherwise, are also individually disclosed by themselves in each case, even if they are described in combination with other features.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lighting device, comprising:
   a semi-rigid arm configured to be brought into various positions in all directions, the arm having a tubular shape and an arm cavity, and proximal and distal ends;
   a lighting head which is attached to the distal end of the arm and supported by the arm;
   a support body having a receptacle cavity configured to accommodate the proximal end of the arm to support the arm;
   an inner support sleeve which is disposed at the proximal end of the arm at least partially in the arm cavity, wherein the portion of the inner support sleeve at least partially disposed in the arm is disposed in the arm cavity with a radial clearance of less than 1 millimeter; and
   a supply cable that extends through the inner support sleeve to the lighting head.

2. The lighting device of claim 1, wherein the lighting device is a passenger seat lamp configured to be permanently mounted on an interior of an aircraft.

3. The lighting device of claim 1, wherein the semi-rigid arm is configured to be flexible.

4. The lighting device of claim 1, wherein the semi-rigid arm is configured to be manually bendable.

5. The lighting device of claim 1, wherein the radial clearance is less than 0.5 millimeters.

6. The lighting device of claim 1, wherein the radial clearance is less than 0.1 millimeter.

7. The lighting device of claim 1,
   wherein the arm has an arm inner surface facing the arm cavity and an opposite arm outer surface, and
   wherein the receptacle cavity of the support body has a radial receptacle cavity inner surface which is at least one of radially clamped and glued to the arm outer surface in an area of the proximal end of the arm.

8. The lighting device of claim 1,
wherein the arm has an annular arm end face at its proximal end, and
wherein the inner support sleeve has a tubular portion and an outer collar connected to the tubular portion, wherein the tubular portion engages in the arm cavity and the outer collar abuts against the arm end face.

9. The lighting device of claim 1,
wherein the receptacle cavity of the support body has a receptacle cavity rear inner surface, and
wherein the inner support sleeve abuts against the rear inner surface of the receptacle cavity.

10. The lighting device of claim 9, wherein the outer collar of the inner support sleeve abuts against the rear inner surface of the receptacle cavity, so that the outer collar of the inner support sleeve is fixed between the rear inner surface of the receptacle cavity and the end face of the arm.

11. The lighting device of claim 1,
wherein a cable passage is provided in the rear inner surface of the receptacle cavity, and
wherein the supply cable extends through the cable passage and through the inner support sleeve and through the arm cavity towards the distal end thereof, to the lighting head, wherein the supply cable comprises at least one of at least one electrical conductor and one optical waveguide.

12. The lighting device of claim 1,
wherein the supply cable comprises a strain relief element, and
wherein the inner support sleeve has a support sleeve inner projection which functions as an abutment for the strain relief element of the supply cable when a tensile force is exerted on the supply cable in the proximal direction.

13. The lighting device of claim 12, wherein the strain relief element is configured in the form of a contracted shrink tube that firmly encloses the supply cable.

14. The lighting device of claim 12,
wherein at least one of the inner support sleeve and the support sleeve inner projection has at least one support sleeve inner edge, and
wherein the at least one support sleeve inner edge is at least one of beveled and rounded.

15. The lighting device of claim 3,
wherein the flexible semi-rigid arm comprises a wound hose which includes two helically interengaging spiraled metal wires, and
wherein the two spiraled metal wires have at least one of different cross sections and are made of different materials.

16. The lighting device of claim 15,
wherein one of the two spiraled metal wires has a round cross section and the other one of the two spiraled metal wires has a wedge-shaped cross-section.

17. The lighting device of claim 15, wherein one of the two spiraled metal wires is made of a harder material than the other one of the two spiraled metal wires.

18. The lighting device of claim 17, wherein the one of the two spiraled metal wires made of the harder material has a round cross section and the other one of the two spiraled metal wires has a wedge-shaped cross section.

19. The lighting device of claim 3, wherein the flexible semi-rigid arm comprises a tubular covering sheath.

20. The lighting device of claim 19, wherein the flexible semi-rigid arm comprises a wound hose which includes two helically interengaging spiraled metal wires and the tubular covering sheath is configured to cover the wound hose of the arm.

21. The lighting device of claim 19, wherein the tubular covering sheath is made of leather, synthetic leather, or plastics.

22. The lighting device of claim 1, wherein the inner support sleeve is made of metal.

23. The lighting device of claim 22, wherein the metal is aluminum or steel.

24. The lighting device of claim 22, wherein the inner support sleeve has a weight of less than 10 grams.

25. A trunk element, comprising:
a flexible semi-rigid tubular body with a tubular cavity;
a receptacle body with a receptacle cavity which accommodates one end of the tubular body; and
an inner support sleeve which is arranged at an end of and at least partially within the tubular body, the support sleeve including a central opening configured to allow passage of a supply cable through the support sleeve, wherein the inner support sleeve is made of metal.

26. The trunk element of claim 25, wherein the trunk element is for a lighting device, the lighting device including a semi-rigid arm configured to be brought into various positions in all directions, the arm having a tubular shape and an arm cavity, and proximal and distal ends, and a lighting head which is attached to the distal end of the arm and supported by the arm, and a support body having a receptacle cavity configured to accommodate the proximal end of the arm to support the arm, and wherein
the inner support sleeve is configured to be disposed at the proximal end of the arm at least partially in the arm cavity.

27. A support sleeve for a lighting device, the lighting device including a semi-rigid arm configured to be brought into various positions in all directions, the arm having a tubular shape and an arm cavity, and proximal and distal ends, and a lighting head which is attached to the distal end of the arm and supported by the arm, and a support body having a receptacle cavity configured to accommodate the proximal end of the arm to support the arm,
the support sleeve configured to be inserted into the arm cavity of the semi-rigid arm of the tubular shape, the support sleeve including a central opening that allows passage of a supply cable through the support sleeve, wherein the supply cable comprises a strain relief element, and wherein the inner support sleeve has a support sleeve inner projection which functions as an abutment for the strain relief element of the supply cable when a tensile force is exerted on the supply cable in the proximal direction.

28. The support sleeve for the lighting device of claim 27, wherein the semi-rigid arm is flexible.

29. A lighting device, comprising:
a semi-rigid arm configured to be brought into various positions in all directions, the arm having a tubular shape and an arm cavity, and proximal and distal ends;
a lighting head which is attached to the distal end of the arm and supported by the arm;
a support body having a receptacle cavity configured to accommodate the proximal end of the arm to support the arm, wherein the arm has an arm inner surface facing the arm cavity and an opposite arm outer surface, and wherein the receptacle cavity of the support body has a radial receptacle cavity inner surface which is at least one of radially clamped and glued to the arm outer surface in an area of the proximal end of the arm;

an inner support sleeve which is disposed at the proximal end of the arm at least partially in the arm cavity; and a supply cable that extends through the inner support sleeve to the lighting head.

\* \* \* \* \*